United States Patent [19]

Sjoquist

[11] Patent Number: 4,603,832

[45] Date of Patent: Aug. 5, 1986

[54] SOLENOID ACTUATOR WITH BLEED SCREW

[75] Inventor: Dennis R. Sjoquist, Yorba Linda, Calif.

[73] Assignee: Evolutionary Concepts, Inc., San Dimas, Calif.

[21] Appl. No.: 742,519

[22] Filed: Jun. 7, 1985

[51] Int. Cl.⁴ ............... F16K 31/385; F16K 31/40
[52] U.S. Cl. .................... 251/30.02; 251/43; 251/46; 251/129.03
[58] Field of Search ........... 251/45, 46, 43, 129.03, 251/129.21, 30.05, 30.02

[56] References Cited

U.S. PATENT DOCUMENTS

| | | | |
|---|---|---|---|
| 2,228,588 | 1/1941 | Ray | 251/30.02 X |
| 3,282,556 | 11/1966 | Hancook | 251/45 X |
| 3,369,565 | 2/1968 | Haggard, Jr. | 251/45 X |
| 3,967,808 | 7/1976 | Lieding | 251/46 |
| 4,508,136 | 4/1985 | Kah, Jr. | 251/46 X |

Primary Examiner—Arnold Rosenthal
Attorney, Agent, or Firm—Boniard I. Brown

[57] ABSTRACT

A bleed screw is built into a solenoid actuator used to control a diaphragm controlled valve so that the valve can be opened manually by means of the bleed screw or remotely or automatically through use of the solenoid. Both the bleed screw and the solenoid actuator are configured to relieve diaphragm pressure maintaining the valve normally closed so that either or both can open the valve.

12 Claims, 4 Drawing Figures

U.S. Patent  Aug. 5, 1986  4,603,832
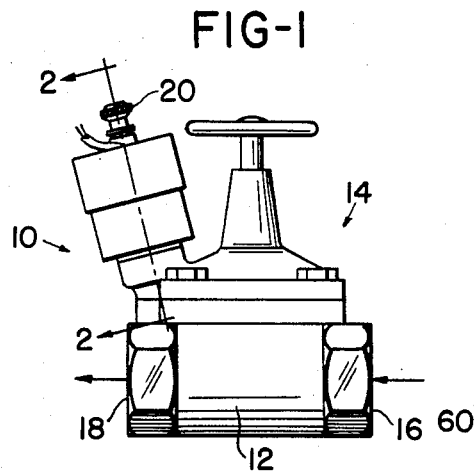
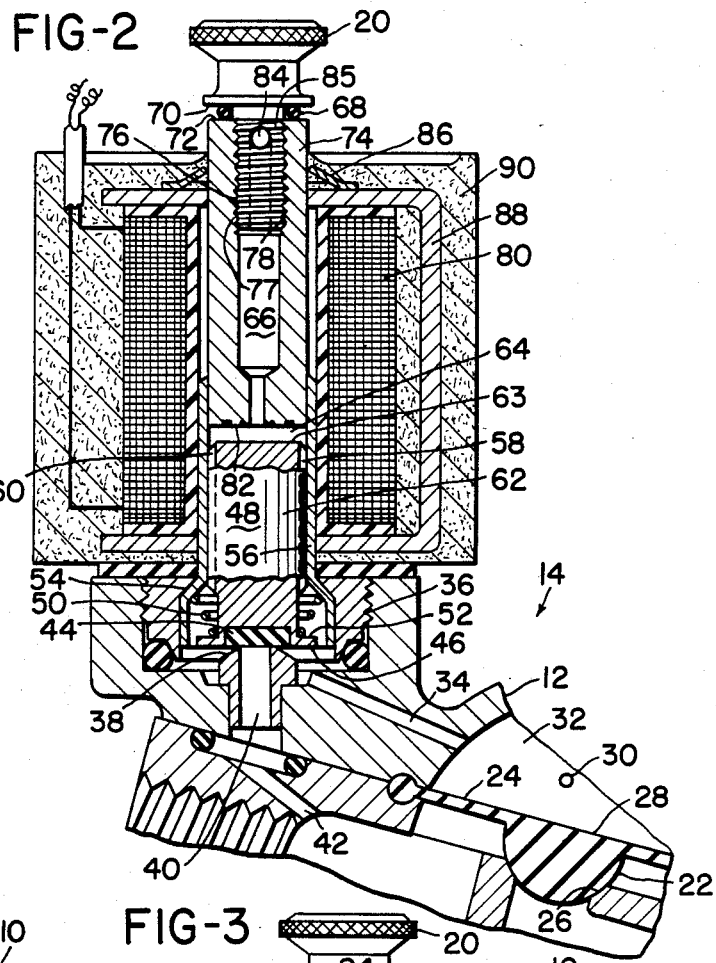
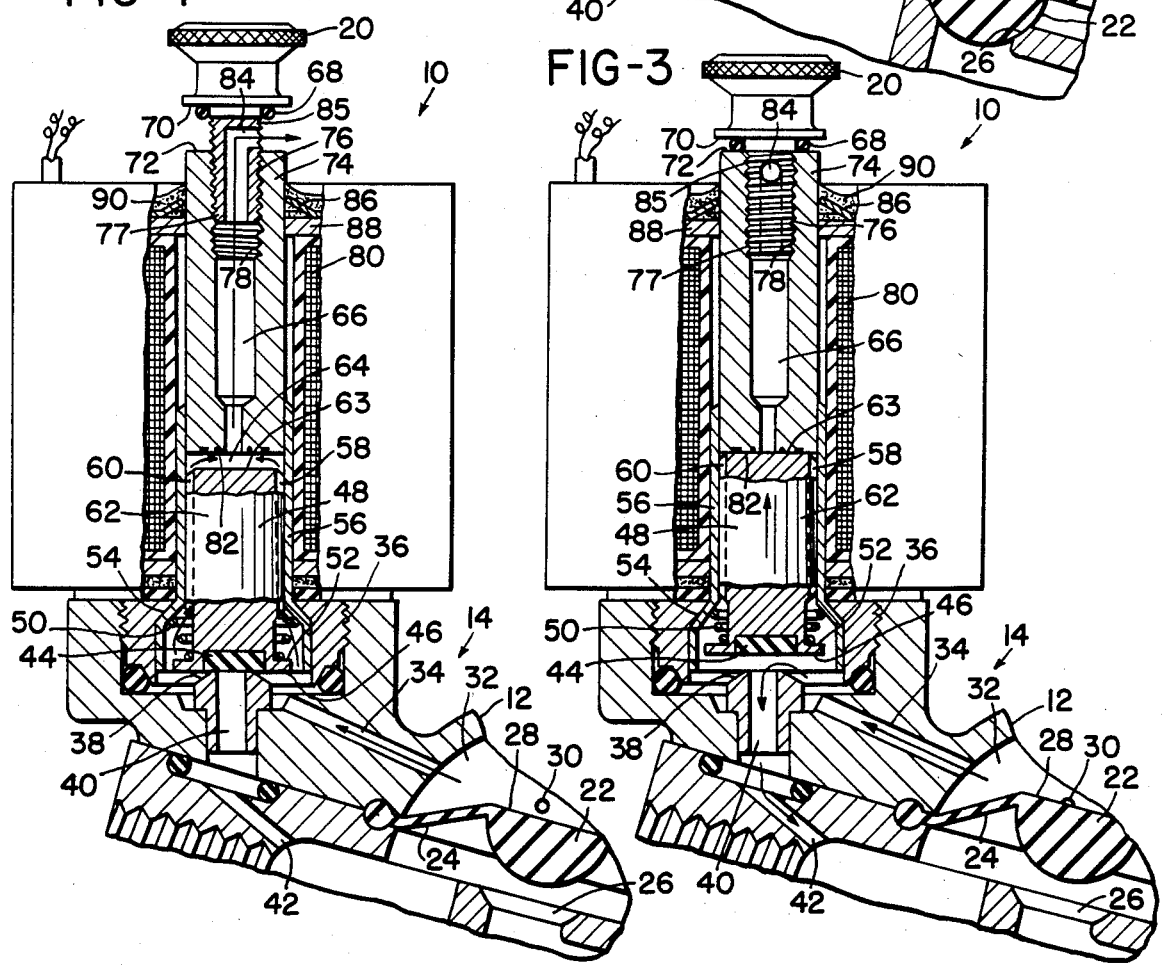

SOLENOID ACTUATOR WITH BLEED SCREW

BACKGROUND OF THE INVENTION

Solenoid actuated, pressure diaphragm valves are widely used in various applications, they being particularly useful in automatic water sprinkling systems. Such a valve includes a valve element which must be unseated to allow flow through the valve. The valve element is controlled by means of a diaphragm positioned so that the pressure generated by the flow medium normally maintains the valve element in a closed condition. It is common to provide a solenoid actuator in association with the valve which upon actuation can relieve the pressure on the valve diaphragm which maintains the valve element in a seated position to open the valve. This is accomplished by including a small relief valve which is opened by movement of a solenoid armature upon electrical energizing of the solenoid. A bleed screw sometimes is provided on the body of such a valve to allow manual actuation thereof. Such bleed screws are manually rotated out of flow passageways to relieve the closing pressure on the valve diaphragm and thus operate the valve member to effect flow through the valve. However, the provision of a bleed screw in the valve body involves substantial added expense during manufacture thereof and often results in leakage problems in service. Since installation sometimes make the valve mounted bleed screw inaccessible, often it is very difficult to use and repair. Therefore, there has been a need to provide manual actuation means for solenoid actuated flow control valves which are easy and economical to manufacture, do not require a modification of an existing valve body, can be retrofitted to existing valves, which includes no complicated mechanism needing frequent repair, and which normally is accessible.

BRIEF DESCRIPTION OF THE PRESENT INVENTION

The present invention is an improved solenoid actuator for a flow control valve which includes a bleed screw with an associated pressure relief passageway so that the valve can be maintained in an opened condition either through electrical inputs or manual inputs. The solenoid actuator is a normally closed actuator having a armature which is biased to seal against a valve seat when the solenoid is de-energized. A bleed screw is mounted coaxially with the solenoid armature in the solenoid actuator body. The bleed screw is designed to provide a flow passage therethrough when unscrewed to relieve any pressure above the solenoid armature. The armature itself includes passageways therethrough which when opened allow communication and hence pressure relief to the diaphragm. Therefore, if either the solenoid is actuated or the bleed screw is in its open position, the valve itself will remain open. This manual operation of the valve is desirable since it allows inspection of the operation of a valve controlled sprinkler system for test and repair, or additional operation of the system during dry spells or during power failures. Since the bleed screw is included in the solenoid actuator, and such is normally located in the valve for easy replacement, it is easily repaired. Also an actuator employing the present invention can be substituted for an existing solenoid actuator, to provide manual bleed screw valve opening means. The cost and complication of incorporating the present inventive features into an existing solenoid actuator is low as very few parts and changes are needed.

It is therefore an object of the present invention to provide manual operation means for a diaphragm operated valve within the solenoid which otherwise allows the valve to be operated remotely.

Another object is to provide a bleed screw control for a flow control valve at low cost and with little impingement upon existing designs.

Another object is to provide a bleed screw opener for a diaphragm valve which is easily operated and requires little maintenance.

These and other objects and advantages of the present invention will become apparent to those skilled in the art after considering the following detailed specification together with the accompanying drawing wherein:

BRIEF DESCRIPTION OF THE DRAWING

FIG. 1 is side elevational view of a solenoid actuator including the present invention installed in the body of a diaphragm controlled valve;

FIG. 2 is an enlarged cross-sectional view of a portion of the valve and the actuator of FIG. 1 shown in its closed condition;

FIG. 3 is a cross-sectional view similar to FIG. 2 when the solenoid is actuated to open the valve; and FIG. 4 is a cross-sectional view similar to FIGS. 2 and 3 with the bleed screw open which causes the valve to remain open.

DETAILED DESCRIPTION OF THE SHOWN EMBODIMENT

Referring to the drawing more particularly by reference numbers, number 10 in FIG. 1 refers to a solenoid actuator installed in a body 12 of a diaphragm operated valve 14. Normally, the valve 14 would be used to control flow from its input 16 to its output 18. The valve 14 can be opened from its normally closed position by energizing the solenoid actuator 10 or opening of a manual bleed screw 20 mounted in the solenoid 10.

The operation of the valve 14 can be seen more clearly by reference to FIGS. 2, 3 and 4. In FIG. 2 the valve 14 is shown in its normally closed position wherein its valve element 22 mounted on a diaphragm 24 is being maintained in a closed position against a valve seat 26 by input pressure applied to the upper surface 28 of the diaphragm 24 through an orifice 30. Since the area of the upper surface 28 is larger than the exposed area of the valve element 22 as defined by the seat 26, the input pressure to the valve tends to maintain the valve element 22 in the closed position shown. The input pressure is applied to the upper surface 28 through an orifice 30 which connects the input 16 of the valve 14 to the diaphragm chamber 32 above the diaphragm 24. So long as there is no flow out of the chamber 32, the orifice 30 causes no pressure drop which otherwise would reduce the pressure in the chamber 32 and allow the valve element 22 to unseat.

A relief passageway 34 is provided through the valve body 12 from the chamber 32 to a threaded port 36 into which the solenoid actuator 10 is screwed. The valve body 12 also includes an additional seat 38 which defines a passageway 40 therethrough which connects with a passageway 42 in the valve body 12 which further connects to the output 18 of the valve 14. The seat 38 is normally maintained is a closed condition by a facing elastomeric insert 44 installed in the end 46 of a solenoid armature 48. The armature 48 is biased into the closed position shown in FIG. 2 by a coil spring 50 which is compressed between a radial flange 52 on the armature end 46 and a frustroconical central portion 54 of a cylindrical armature housing 56.

As shown in FIG. 2, the armature 48 includes longitudinal grooves 58 and 60 in the cylindrical side 62 thereof which allows the equalization of pressure from the chamber 32 through the passageway 34 to the upper end 63 of the armature 48 in the chamber 64 thereabove. The chamber 64 includes a relief passageway 66 centrally located in the solenoid actuator 10 which normally is blocked by the bleed screw 20 and sealed by an O-ring 68 captured between a downwardly facing flange surface 70 of the bleed screw 20 and an upwardly facing shoulder 72 of a cylindrical body 74 which defines the passageway 66 therethrough. As shown, the bleed screw 20 includes external threads 76 at one end 77 which engage internal threads 78 in the passageway 66 to maintain engagement between the bleed screw 20 and the body 74. So long as the armature 48 blocks flow through the seat 38 and the bleed screw 20 blocks flow through the passageway 66, the valve element 22 remains closed as shown in FIG. 2.

When the coil 80 of the solenoid actuator 10 is energized, sufficient electromagnetic force is applied to the armature 48 to move it upwardly to the position shown in FIG. 3. As the armature 48 lifts, the flow medium in the chamber 64 is squeezed out through the grooves 58 and 60 which damps the motion of the armature 48 to extend its lifetime. The lower end 82 of the body 74 against which the upper end 63 engages during operation, as shown in FIG. 3, has therein a pair of concentric copper rings which act as a shade coil between armature upper end 63 and body lower end 82, and serve to electrically dampen A.C. buzz.

When the armature 48 is lifted so that its insert 44 opens the seat 38, the pressure in the chamber 32 is relieved due to the pressure drop across the orifice 30 caused by flow through the passageway 34, the seat 38 and the passageways 40 and 42, so that the diaphragm 24 allows the valve element 22 to open with respect to the seat 24 and allow flow from the input 16 to the output 18 of the valve 14. When the coil 80 is de-energized, the spring 50 forces the insert 44 against the seat 38 closing off the relief passage and therefore allowing the pressure within chamber 32 to rebuild to such an extent that the diaphragm 24 forces the valve element 22 into seal engagement with the seat 26.

When it is desired to manually open the valve 14, the bleed screw 20 is rotated until it assumes the position shown in FIG. 4 wherein the O-ring 68 is unseated from the shoulder 72 and a relief passage 84, which extends through the bleed screw 20 from the end 77 out its side 85 below the O-ring 68, opens the chamber 66 to the ambient pressure as shown. This relieves the pressure in chamber 32 through passage 34 and the grooves 58 and 60 so that again the diaphragm 24 allows the valve element 22 to become unseated from the seat 26 to open the valve 14. When the bleed screw 20 is returned to the position shown in FIG. 2 with the O-ring 68 preventing flow through the passage 84, the pressure within the chamber 32 again builds through the orifice 30 and the diaphragm 24 forces the valve element 22 back into sealing position with the valve seat 26.

It should be noted that the inclusion of the passageway 66, the threads 78 and the bleed screw 20 require little in the way of manufacturing effort. In a normal solenoid actuator 10, a plug takes the place of the body 74 so that the only extra parts involved are the bleed screw 20 and the O-ring 68, with a slightly more complex manufacturing process involved in providing the passageway 66 through the body 74. The body 74 is held within the actuator 10 by means of a conventional push-on fastener or lock washer 86 which then with the coil 60, its yoke 88 and the body 74 are encapsulated by an epoxy resin container 88.

Therefore, there has been shown and described a novel solenoid actuator including a bleed screw for electrically and/or manually operating a diaphragm-type valve which fulfills all of the objects and advantages sought therefore. Many changes, modifications, variations and other uses and applications of the subject invention will however, become apparent to those skilled in the art after considering this specification together with the accompanying drawing. All such changes, modifications, variations and other uses and applications which do not depart from the spirit and scope of the invention are deemed to be covered by the invention which is limited only by the claims which follow.

What is claimed is:

1. A solenoid actuator for controlling a pressure diaphragm valve by relieving the closing pressure thereof maintained at a first valve seat thereof including:
   an armature positioned to normally close the first valve seat;
   a coil positioned to move said armature to open the first valve seat to relieve the closing pressure on the pressure diaphragm valve;
   manual relief means in communication with the closing pressure acting on the pressure diaphragm valve whereby said manual relief means upon manual actuation relieves the closing pressure on the pressure diaphragm valve and thus allows it to open, said manual relief means including:
      a hollow threaded body having:
         a shoulder surface; and
      a bleed screw positioned in said hollow threaded body having:
         a bleed screw relief passageway therethrough in communication with the closing pressure acting on the pressure diaphragm valve; and
         means for sealing said bleed screw relief passageway; and
   a hollow housing in which said armature is slidably positioned and in which said hollow threaded body is fixed.

2. The solenoid actuator as defined in claim 1 wherein said means for sealing said bleed screw relief passageway include:
   a ring shaped flange facing said shoulder surface; and
   an O-ring positioned between said ring shaped flange and said shoulder surface.

3. The solenoid actuator as defined in claim 1 wherein said armature includes:
   a first end surface facing the first valve seat and adapted to make sealing contact therewith;
   a second end surface opposite from said first end surface facing said hollow threaded body; and
   a side surface between said first and second end surfaces, said side surface including:
      a passageway therein from said first end surface to said second end surface.

4. The solenoid actuator as defined in claim 1 wherein said armature includes:
 a first end surface facing the first valve seat and adapted to make sealing contact therewith;
 a second end surface opposite from said first end surface facing said hollow threaded body; and
 a side surface between said first and second end surfaces, said armature defining at least one passageway from said first end surface thereof to said second end surface thereof.

5. The solenoid actuator as defined in claim 1 wherein said armature includes:
 a first end surface facing the first valve seat and adapted to make sealing contact therewith; and
 a second end surface opposite from said first end surface facing said hollow threaded body, said armature and hollow housing defining at least one passageway from said first end surface to said second end surface.

6. A solenoid actuator including:
 a housing having:
  a first end portion; and
  a second end portion;
 a hollow threaded body positioned at said first end portion of said housing;
 a bleed screw positioned in said hollow threaded body having:
  a bleed screw relief passageway therethrough; and
  means for sealing said bleed screw relief passageway; and
 an armature positioned in said second end portion of said housing, said armature having:
  a first end surface adapted for sealing contact with a valve seat; and
  a second end surface opposite from said first end surface facing said hollow threaded body, said armature and said housing defining at least one passageway from said first end surface to said second end surface.

7. The solenoid actuator as defined in claim 6 wherein said hollow threaded body includes:
 a shoulder surface, and said means for sealing said bleed screw relief passageway include:
 a ring shaped flange facing said shoulder surface; and
 an O-ring positioned between said ring shaped flange and said shoulder surface.

8. The solenoid actuator as defined in claim 6 wherein said armature further includes:
 a side surface between said first and second end surfaces, said side surface including:
  a passageway therein from said first end to said second end.

9. The solenoid actuator as defined in claim 6 wherein said armature further includes:
 a side surface between said first and second end surfaces, said armature defining at least one passageway from said first end surface thereof to said second end surface thereof.

10. A solenoid actuator including:
 a housing having:
  a first end portion; and
  a second end portion;
 a hollow threaded body positioned at said first end portion of said housing;
 a bleed screw positioned in said hollow threaded body having:
  a bleed screw relief passageway therethrough communicating said housing second end portion to ambient pressure; and
 an armature positioned in said second end portion of said housing, said armature having:
  a first end surface; and
  a second end surface opposite from said first end surface facing said hollow threaded body, said armature and said housing defining at least one passageway from said first end surface to said second end surface.

11. The solenoid actuator as defined in claim 10 wherein said hollow threaded body includes:
 a shoulder surface, and said bleed screw includes:
 a ring shaped flange facing said shoulder surface; and
 an O-ring positioned between said ring shaped flange and said shoulder surface.

12. The solenoid actuator as defined in claim 11 wherein said bleed screw includes:
 an end facing said armature; and
 a side surface, said bleed screw relief passageway extending from said end facing said armature to said side surface thereof adjacent said O-ring.

* * * * *